United States Patent [19]
Graves

[11] 3,914,439
[45] Oct. 21, 1975

[54] DRY PARTICULATE FLAVOR COMPOSITION, METHOD OF MAKING SAME AND USE THEREOF

[75] Inventor: Robert E. Graves, Washingtonville, N.Y.

[73] Assignee: Shepard Chemical Industries, Inc., New York, N.Y.

[22] Filed: Aug. 16, 1974

[21] Appl. No.: 498,077

[52] U.S. Cl. .................. 426/78; 426/96; 426/98; 426/99; 426/289; 426/292; 426/295; 426/223
[51] Int. Cl.² .................. B65B 29/02; A23L 1/216
[58] Field of Search ......... 426/65, 78, 98, 193, 221, 426/289, 295, 443, 273, 293, 96, 99, 303, 304, 307

[56] References Cited
UNITED STATES PATENTS

| | | | |
|---|---|---|---|
| 2,855,315 | 10/1958 | Perrozzi et al. | 426/303 |
| 3,389,000 | 6/1968 | Fujita et al. | 426/65 |
| 3,666,496 | 5/1972 | Honey et al. | 426/96 |

*Primary Examiner*—A. Louis Monacell
*Assistant Examiner*—C. A. Fan
*Attorney, Agent, or Firm*—Hubbell, Cohen and Stiefel

[57] ABSTRACT

Liquid flavor oils such as lemon oil are absorbed on to sugar crystals having hydrogenated vegetable oil coatings thereon and sealed therein with a shellac coating to form a dry, freeflowing particulate flavor composition. A method of absorbing the liquid flavor oil onto the hydrogenated vegetable oil without melting the latter is disclosed. Also disclosed are tea brewing bags containing, in addition to cut tea leaves, the particulate flavor composition which can be used to brew lemon flavored tea.

33 Claims, No Drawings

DRY PARTICULATE FLAVOR COMPOSITION, METHOD OF MAKING SAME AND USE THEREOF

BACKGROUND OF THE INVENTION

1. Field of the Invention

The invention relates to flavorings. In particular, the invention relates to heat and air sensitive flavoring materials such as lemon oil, which have been encapsulated to prevent degradation thereof. The invention also relates to methods for preparing the encapsulated flavoring materials and to the use of such flavoring materials, particularly, in tea bags to provide brewed tea flavored with, for example, lemon oil. Thus, the invention relates to lemon flavored tea.

2. Description of the Prior Art

Lemon flavored tea bags are known. However, in all previously known lemon flavored tea bags, there have been numerous problems which have made such products either technically or commercially unacceptable.

Thus, for example, one such product consists of a blend of four parts of cut tea to one part of a lemon oil/citric acid flavor in tea bags. The flavor is a mixture of lemon oil, citric acid and corn syrup solids hardened into a "candy" which is broken into small, non-uniform particles for blending with the tea. This product is unsatisfactory because:

1. upon standing for any period of time, the lemon flavor became terpeney, that is, it took on a typical terpenoid character as a result of degradation of the lemon oil due to oxygen exposure;

2. the tea bags developed unacceptable brown stains which resulted from the fact that citric acid is a highly hygroscopic substance. Thus, the citric acid absorbed moisture from the ambient air and this moisture then extracted small quantities of tea from the tea leaves, the extracted tea subsequently being deposited on the paper tea bags;

3. the tea bags did not have a uniform distribution of tea and flavor because the non-uniform particles which in conventional tea bag filling operations are carefully charged to an overhead hopper along with the required amount of tea, tended to stratify and separate from the tea during packaging. Thus, the heavier particles tended to sift down through the tea leaves in the bag filling hopper and some tea bags were filled with almost all flavor, others with the proper ratio of tea to flavor and still others with almost all tea. This inhomogeneity of the filled bags made the product unacceptable from a commercial standpoint.

In addition to lemon flavored tea and tea bags, there are several methods known for encapsulating flavors and other heat and air sensitive materials.

For example, in U.S. Pat. No. 3,689,290 a method of encapsulating particulate food products such as cheese, onion and garlic flavors is disclosed. In this method the food product is formed into particles with a carrier such as starch and a fat, such as hydrogenated vegetable oil, with the particles thereafter being coated with a protective material such as dry corn syrup solids.

In U.S. Pat. No. 3,389,000, there are disclosed methods of coating flavorings such as nucleoside-S'-phosphates with hydrogenated vegetable oil, all of said methods involving melting the oil to coat the flavoring substance.

U.S. Pat. No. 3,666,496 discloses a particulate product including a citrus oil coated on a solid carrier and a block copolymer. This reference suggests that vegetable oils, particularly, brominated vegetable oils are not suitable for the process.

U.S. Pat. No. 3,660,115 discloses particulate compositions including orange oil coated on freeze dried gelatin which is then coated with an outer protective coating material.

Finally, the article, "Uses for Microencapsulation in Food Additives" by Graves in Cereal Science Today, Vol. 17, No. 4 (April, 1972), pps. 107–109 describes inter alia, the encapsulation of various acidulants including citric acid.

SUMMARY OF THE INVENTION

An object of the present invention is to provide a flavoring material for use in tea bags which avoids the problems associated with the heretofore known lemon flavored bags. However, in order to achieve this object, it was necessary to devise entirely new concepts and methods for encapsulating flavoring materials. Accordingly, the present invention provides, not only a lemon flavored tea bag, but a novel and unique, dry, free-flowing particulate flavor composition for use in a tea bag. In addition, the invention provides novel methods of preparing such particulate flavor compositions.

Thus, in one aspect thereof the invention provides a dry, free-flowing particulate flavor composition in which a liquid flavor oil such as lemon oil is encapsulated within a particulate composition. The particulate composition comprises a crystalline sugar core having a layer of hydrogenated vegetable oil coated thereon. The sugar comprising the core may, for example, be any edible sugar such as sucrose, glucose, mannitol or sorbitol. Preferably, sucrose is used. Absorbed onto the layer of hydrogenated vegetable oil is a layer of liquid flavor oil, preferably lemon oil, and most preferably, a lemon oil comprising a major portion of a relatively non-volatile lemon oil. The layer of liquid flavor oil then has an additional coating of hydrogenated vegetable oil. Thus, the liquid flavor oil is disposed between and absorbed onto two layers of hydrogenated vegetable oil adjacent thereto. Additional successive layers of liquid flavor oil and hydrogenated vegetable oil may be deposited on the particulate until a desired concentration of flavor oil is present in the composition. The composition finally includes an outer, protective layer of an edible shellac to seal in the flavor oil absorbed onto the hydrogenated vegetable oil.

The crystalline sugar core is preferably of a particle size greater than about 150 mesh and more preferably, between about 30 and 50 mesh.

The hydrogenated vegetable oil is a finely powdered form thereof having a melting point of between about 125°F and 140°F, preferably about 135°F. Generally, the hydrogenated vegetable oil is a blend of one or more of hydrogenated soya, corn, cotton-seed or other edible vegetable oils having a melting point of about 125° to 140°F and a mesh size smaller than about 100 mesh. A typical example of such a material is the product known as "Setsquick" and sold by the Food Ingredients Division of Henry Ottens Co., Philadelphia, Pennsylvania. This product is a blend of plant oils, predominantly coconut oil and corn oil and has an acid value of up to 0.4, a moisture content of up to 0.1 percent and an iodine value of up to 5. The liquid flavor oil, preferably, lemon oil is most preferably a 50:50 blend of (a) single-fold, cold-pressed lemon oil and (b) volatile lemon juice essences.

In an alternative embodiment, the particulate composition may include a layer of gum arabic between the outermost layer of hydrogenated vegetable oil and the outer coating of shellac.

The relative amounts of sugar, hydrogenated vegetable oil and liquid flavor oil may vary over a wide range depending upon how much flavor oil is desired in the composition, the ratio being about 5:3:2 most preferably, the ratio is about 6:3:1.

In another aspect of the invention there is provided a method of making the above-described particulate composition. According to the method, crystalline sugar particles which have been wetted with liquid sugar, i.e., a sugar syrup formed by supersaturating an aqueous sugar solution are coated with finely powdered hydrogenated vegetable oil, then with a liquid flavor oil and then again with hydrogenated vegetable oil. The coating steps are successively repeated until the desired amount of liquid flavor oil has been absorbed onto the hydrogenated vegetable oil and then a final outer protective coating of an edible shellac is applied to the particles. In the case where gum arabic is to be added to the composition, this is done before the shellac coating is applied.

In yet another aspect of the invention there is provided a flavored tea bag, preferably, a lemon flavored tea bag. According to this aspect of the invention, a conventional tea bag comprising a porous paper bag and a preselected amount of cut tea leaves further includes an amount of the particulate flavor composition of the invention sufficient to impart to a brewed portion of tea the flavor of said flavor oil. The flavored tea bag, may, in a still further embodiment, include, in addition to the particulate flavor composition, a preselected amount of particles of citric acid encapsulated in hydrogenated vegetable oil.

DETAILED DESCRIPTION OF THE INVENTION

The invention, in its several aspects will now be described in more detail, and in particular, with regard to the following examples which illustrate the invention and the manner and method of making the same.

As pointed out above in connection with the prior art, attempts have heretofore been made to provide lemon flavored tea bags. These attempts failed because the flavoring material included within the tea bags had certain disadvantages which made their use unacceptable. Thus, in making the present invention it was necessary to begin where the prior art techniques left off.

Certain preliminary investigations were carried out to more clearly define the problems that stood in the way of successful completion of the invention.

PRELIMINARY INVESTIGATIONS

Since citric acid is conventionally used to impart a citrus flavor character to numerous foods and beverages, an encapsulated or coated citric acid composition was prepared and tested in tea bags. For this purpose it was necessary that the coated citric acid particles not pick up moisture from the ambient atmosphere. Based on past experience it was reasonable to expect that hydrogenated vegetable oil would be a suitable substance for the coating because in addition to being a good moisture barrier, this material is known not to degrade tea as many other possible coating agents do.

Accordingly, a particulate composition consisting of hydrogenated vegetable oil (M.P. 125°F) coated citric acid particles was prepared by applying molten hydrogenated vegetable oil onto a plurality of citric acid particles and thereafter cooling the particles to set the hydrogenated vegetable oil and thereby form a coating thereon. These coated particles were then included within tea bags for evaluation. When tea was brewed with such tea bags, the hydrogenated vegetable oil coating obviously melted and the citric acid was released into the brewing tea. There was, however, one problem that had to be considered. It was uncertain whether, upon melting, the hydrogenated vegetable oil would pass through the tea bag into the brewed tea or whether it would remain behind in the tea bag. Obviously, if it passed through the tea bag, it would be unacceptable from both esthetic and commercial viewpoints. In fact, the melted hydrogenated vegetable oil did not pass through the tea bag, but remained trapped therein. Nevertheless, this approach to the problem was unsuitable because, as pointed out above, the coated citric acid particles tended to stratify within the cut tea leaves and thus there could be no assurance of uniform distribution of coated citric acid from tea bag to tea bag.

Thereafter, attempts were made to incorporate a lemon flavor oil in tea bags together with encapsulated citric acid as the flavor source. However, when the liquid flavor oil was put into a dry form, using conventional spray drying techniques, the resulting particles were so fine in particle size that they not only separated from the tea, but in large part sifted through the porous bag. This was clearly unacceptable.

Additional efforts were made to put a liquid lemon flavor into a dry form that would not separate from the tea during packaging, would release in hot water, and would be stable on prolonged storage. Numerous techniques were tried, including agglomeration, tabletizing, and various commerical encapsulation techniques. All of these were tried and found to be unsuitable either for technical or economic reasons.

Thereafter, the encapsulation technique known as pan coating was considered as a possible avenue of approach to the problem.

In pan coating, small solid particles, often sugar, are introduced into a rotating circular pan. A solution, usually sugar and starch in water, is sprayed onto the sugar until it is wetted. Heat is applied to the pan to evaporate the water, leaving behind the sugar and starch solids which become attached to the starting crystals. The procedure is repeated again and again until the desired particle size is obtained. Of course, depending upon the nature of the product which is being prepared by this technique, other ingredients are often added for flavoring, coloring, and polishing (shellac or carnauba wax). The function of the starch is that of a "filling," and because of the use of starch, the resulting coated particles are nearly always spherical. If sugar alone were to be sprayed onto the particles, the geometric shape of the finished particle would be the same as that of the small starting crystal. The presence of starch makes the particles take on a spherical shape very quickly. Clearly, the basic pancoating technique is not satisfactory. It is too expensive, a spherical shape is likely to stratify in the tea bags, and the long period of up to three days of processing needed to achieve optimum particle size is so long as to make the process uneconomical.

THE PROCESS OF THE INVENTION

Thus, while the conventional pan-coating technique is unacceptable, it nevertheless proved to be the basis for the process of the invention.

Since one of the major disadvantages of the pan-coating technique is the fact that with very small sugar crystals, the ultimate coated product is too small to be effectively used in tea bags, it was decided to use a considerably larger sugar crystal and one with an irregular crystal shape. To this end, use was made of sugar crystals having a size larger than about 150 mesh, and preferably, a size of about 30–50 mesh. In addition, another major disadvantage of the pan-coating technique is the fact that the materials used for applying successive coatings are generally either in solution or, in the case of a hydrogenated vegetable oil, in molten form. It is not desirable to use molten hydrogenated vegetable oil to encapsulate a liquid flavor oil such as lemon oil because such flavor oils are heat sensitive and the hot molten hydrogenated vegetable oil would degrade the flavor oil. It was, therefore essential to develop a technique in which hydrogenated vegetable oil could be used at room temperature, i.e., in the solid state. To this end, use was made of a finely powdered hydrogenated vegetable oil melting at 135°F and sold by the Henry Ottens Co. (Philadelphia, Pennsylvania) under the trademark "Setsquick."

It was felt, based on the availability of this kind of finely powdered hydrogenated vegetable oil, and subsequently proven to be true, that if a sugar crystal of suitable size could be coated with a liquid flavor oil and subsequently encased or otherwise "fixed" with the hydrogenated vegetable oil, one would be able to obtain a stable, dry, particulate flavoring composition that would be compatible with cut tea leaves; i.e., it would not stratify, nor would it degrade upon long standing.

The use of such as hydrogenated vegetable oil led to the process of the invention and in particular, to an encapsulating method never before used. Thus, normally, when a particle is to be coated with hydrogenated vegetable oil, the oil is first melted and applied as a liquid. For the purposes of the invention, heating of the hydrogenated vegetable oil was undesirable. Firstly, at elevated temperatures the aromatic flavor of the lemon oil was certain to volatilize and degrade. Secondly, such a technique would invariably lead to a non-uniform agglomerate and the ultimate particles would lose the size and shape of the original sugar crystals which is necessary to prevent stratification in the tea leaves. Thirdly, there did not appear to be a suitable way of applying the hot molten oil.

It did, however, seem possible that if the liquid flavor oil were blended with a rather high melting hydrogenated vegetable oil (over 130°F) that there might be some ratio of flavor to oil which when mixed would be a dry solid at room temperature.

Accordingly, several experiments were run to determine if this could, in fact be done, and ultimately a suitable process was developed.

EXPERIMENT 1

The recipe for this example is as follows:
| | |
|---|---|
| sucrose - crystal size 30/50 mesh | 3 lbs. |
| liquid corn oil | ½ lb. |
| hydrogenated vegetable oil ("Setsquick") | ½ lb. |
| lemon flavor oil | 1 lb. |

In this experiment, the sugar was thoroughly mixed in a rotating pan with the lemon oil and liquid corn syrup. Powdered hydrogenated vegetable oil was added incrementally in the hope that it would dissolve in the lemon oil-corn oil blend and achieve a "set", i.e., the liquid ingredients would solidify around the sugar crystals.

This experiment failed. The resulting product remained wet and agglomerated. Also, it was observed that the very volatile lemon flavor was being driven off even though no heat was applied. The large surface to flavor-mass ratio caused significant flavor loss and still the product was not a dry one.

EXPERIMENT 2

The recipe for this example is as follows:
| | |
|---|---|
| sucrose - crystal size 30/50 mesh | 3 lbs. |
| lemon flavor oil | ½ lb. |
| hydrogenated vegetable oil | ½ lb. |
| liquid corn oil | ½ lb |

In this experiment the amount of flavor oil was reduced by 50 percent. The liquid corn oil was retained in the belief it would tend to solubilize the hydrogenated vegetable oil more quickly than the flavor would and that somehow this would lead to a more uniform particle. The procedure was the same as for Experiment 1, but again, a dry product was not obtained.

EXPERIMENT 3

The suitability of the liquid corn oil was suspect. It appeared that the corn oil was preventing the product from "setting." Thus, a series of tests in which corn oil was mixed with flavor in different ratios showed that the liquid corn oil and the hydrogenated vegetable oil in almost all combinations results in a liquid or viscous paste, and not the solid coating material that was desired.

EXPERIMENT 4

In this experiment, the liquid corn oil was eliminated and replaced by hydrogenated vegetable oil. The recipe for this experiment is as follows:

| | |
|---|---|
| sucrose - particle size 30/50 mesh | 3 lbs. |
| hydrogenated vegetable (m.p. 135°F) | 1 lb. |
| lemon flavor oil | ½ lb. |

In this experiment, lemon flavor oil was applied to the sugar and after thorough mixing the hydrogenated vegetable oil was added. It was observed that the hydrogenated vegetable oil was dissolving in the flavor oil and after approximately 15 minutes of mixing, a dry, free-flowing product was formed. About 75 percent of the sugar particles had an hydrogenated vegetable oil coating. However, the flavor was weak and it appeared that although "setting" had occurred, it was because a substantial amount of the flavor had evaporated and a small amount of flavor remained behind, dissolved in a large amount of hydrogenated vegetable oil.

The material obtained in Experiment 4 was evaluated in tea, and on open air storage. Initially, the flavor was weaker than it should be based on a theoretical concentration of 11 percent and on standing for a few days the flavor had almost disappeared. Clearly, unacceptable losses occurred during processing, and on storage.

EXPERIMENT 5

In this and succeeding experiments, the lemon flavor oil which was used was a mixture of a relatively volatile lemon oil and a relatively non-volatile lemon oil in varying amounts. The recipe for this experiment was as follows:

| | |
|---|---|
| sucrose - particle size 30/50 mesh | 6 lbs. |
| hydrogenated vegetable oil | 3 lbs. |
| lemon oil* | 1 lb. |
| shellac in ethanol solution** | 3 oz. |

*a 50:50 mixture of volatile single-fold, cold-pressed lemon oil and non-volatile lemon oil
**a solution of 4 lbs. of confectioners shellac q.s. to 1 gallon of ethanol In this experiment the batch size was doubled and the composition of the flavor oil was changed to reduce its volatility. In view of the fact that the product of Experiment 4 lost flavor during storage as well as during processing, a small amount of shellac was added after the encapsulate was formed. The shellac used was an edible shellac dissolved in ethanol in the amount of 4lbs. of shellac per gallon of ethanol. The 3 oz. refers to 3 oz. of solution. It was thought that the shellac would provide an additional barrier and would further retard flavor loss and oxygen degradation during storage.

The procedure followed in this experiment was the same as was used in Experiment 4, with the exception of the shellac addition. The shellac solution was poured slowly into the mass after a "set" took place and the material was free-flowing. The particles began to agglomerate, but as the alcohol evaporated it again became dry and free-flowing, although less uniform than it had been. A large number of large white particles of hydrogenated vegetable oil were visible, as were many unencapsulated sugar crystals. It was apparent that the addition of shellac had stripped the hydrogenated vegetable oil from some of the crystals. The material was retained for later evaluation.

EXPERIMENT 6

The recipe for this experiment was as follows:
| | |
|---|---|
| sucrose - particle size 30/50 mesh | 6 lbs. |
| hydrogenated vegetable oil | 3 lbs. |
| lemon oil | 1 lb. |

In this experiment the lemon flavor oil was modified to further reduce the volatility. Thus, 75 percent of the relatively non-volatile oil and only 25 percent of the volatile flavor oil were used. In order to obtain a better evaluation of the assumed stabilizing effect of the shellac coating, this experiment was conducted with no shellac for comparison purposes. The process technique was the same as for Experiment 5 and the resulting product was examined and stored for further evaluation. It was reasonably uniform. It still contained some large particles of hydrogenated vegetable oil, but most of the sugar crystals seemed to be properly coated.

EXPERIMENT 7

The recipe and procedure for this experiment was identical with that used in Experiment 6 except that at the conclusion, 3 oz. of the shellac solution was added in the same manner as in Experiment 5. The product was retained for later evaluation.

EXPERIMENT 8

The recipe for this experiment was the same as for Experiment 7, but after the product had "set" and the first 3 oz. of shellac solution were added and the ethanol evaporated, an additional 3 oz. of shellac solution were added. Again, the product was retained for later evaluation.

EXPERIMENT 9

Evaluation of samples obtained in Experiments 5–8.

Samples obtained from each of Experiments 5–8 were evaluated after five days of open air storage, first in hot water and later in tea bags to determine their relative suitability for use in the end product. The following observations were made:

Sample 1 (Experiment 5) Strong lemon flavor was released in hot water or tea within 3 minutes. The shellac had no noticeable effect on the tea. Sample 2 (Experiment 6) Very fast dissolving, but weak lemon flavor.

Sample 3 (Experiment 7) Flavor released within 3 minutes. Flavor character not much different from that of Sample 1.

Sample 4 (Experiment 8) Slow dissolving. Flavor weak, but not as weak as in Sample 2. The effect of the presence of a double coating of shellac was obvious in view of the weak flavor.

Based on the above observations, several conclusions were reached concerning the development of the process for preparing the particulate flavoring composition. The conclusions are that:

1. The lemon oil blends containing the non-volatile lemon oil, e.g., (50:50 volatiles to non-volatiles, and 75:25 non-volatiles to volatiles) seemed to give a reasonably satisfactory flavor and aroma to tea and did not appear to be lost to any appreciable amount during the processing.
2. The basic recipe consisting of one part of hydrogenated vegetable oil, ½ part of lemon oil, and two parts of sugar crystals generally gave acceptable results. While this is not necessarily an essential or critical ratio of flavor to sugar to hydrogenated vegetable oil, the concept of solidifying hydrogenated vegetable oil on a sugar crystal by dissolving more hydrogenated vegetable oil in the flavor than the flavor can accept and still remain a liquid, had been proved possible.
3. The addition of a shellac coating to the particles retarded evaporation and did no harm to the product's performance in tea bags. An additional shellac coating resulted in a product which did not impart much flavor to the tea and what flavor was released was late in coming. Thus, while one shellac coating is beneficial in stabilizing the flavor, changes had to be made in its application since large amounts of hydrogenated vegetable oil were removed in the process.

It was thus necessary to refine the process in such a way as to be able to a. coat with shellac without removing hydrogenated vegetable oil.

b. obtain a more uniform product, i.e., eliminate large agglomerates of hydrogenated vegetable oil and unencapsulated sugar crystals; and c. reduce the amount of scrap and improve the technique so that if required, the process could be scaled-up to produce commercial quantities of flavor particles.

The following example represents the most preferred embodiment of the process of the invention.

EXAMPLE

The recipe for this example was as follows:

| | |
|---|---|
| sucrose - particle size 30/50 mesh | 6 lbs. |
| liquid sugar* | 2 cups |
| lemon oil** | 1 lb. |
| hydrogenated vegetable oil*** | 3 lbs. |
| ethanolic shellac solution | 3 oz. |

*a supersaturated aqueous solution of sucrose
**a mixture of 75% non-volatile lemon oil and 25% volatile lemon oil.
***"Setsquick" Hydrogenated Vegetable Oil, m.p. 135°F The following steps were performed in order:
1. 6 pounds of sugar crystals were placed into a revolving pan and two cups of liquid sugar were slowly added thereto while the pan continued revolving. Thereby, the sugar crystals were completely wetted by the liquid sugar, but they remained crystalline in form.
2. About 1 pound (⅞ of the total) of the finely powdered hydrogenated vegetable oil was slowly added to the revolving pan to coat the wetted sugar particles with the hydrogenated vegetable oil.
3. The still revolving pan was heated slightly by a gas burner placed beneath it and mixing was continued until all traces of moisture from the liquid sugar were removed. It is important that heating be carefully controlled so as not to melt the hydrogenated vegetable oil.
4. A portion of the lemon oil (about 15 percent of the total) was slowly added to the hydrogenated vegetable oil coated sugar particles in the revolving pan and mixing was continued until all the lemon oil was absorbed onto the hydrogenated vegetable oil coating.
5. Another portion of lemon oil (also about 15 percent) of the total) was then added in the same manner as in step 4.
6. An additional portion of 15 percent of the hydrogenated vegetable oil was added and coated on top of the preceding layer.
7. Steps 4 and 6 were repeated until all of the hydrogenated vegetable oil and lemon oil had been added.
8. Finally, the shellac solution was poured into the revolving pan to coat the particles with an outer protective coating of shellac.

The resulting product was a vast improvement over anything made in the previous experiments. The particles were uniform in size and shape and the coating was spread evenly over the sugar crystals. The amount of particles and/or agglomerated material was reduced significantly. It appeared that the use of liquid sugar to bond the first coat of hydrogenated vegetable oil to the sugar crystals as well as the incremental addition of flavor oil and hydrogenated vegetable oil toughened the coating enough so that the subsequent shellac addition did not strip the particles of hydrogenated vegetable oil as had occurred in some of the previous experiments.

This example was repeated several times and the results were found to be reproducible and quite satisfactory.

However, in one instance it was found that after all of the hydrogenated vegetable oil and flavor had been added the product was slightly tacky. To overcome this, one cup of gum arabic was mixed in and quickly absorbed. The tackiness disappeared and after the shellac was added the particles seemed harder and more durable than particles containing no gum arabic. It thus appears that the use of gum arabic may provide an even more improved product even in the absence of the tackiness which was sought to be avoided.

Samples of the product made in accordance with this example were evaluated in tea bags and were found to be acceptable in all respects.

Variations and modifications can, of course, be made without departing from the spirit and scope of the invention.

Having thus described my invention, what I desire to secure by letters Patent and hereby claim is:

1. A dry, free-flowing particulate flavor composition comprising a crystalline sugar core having at least two hydrogenated vegetable oil layers surrounding said core, at least one liquid flavor oil layer between said two hydrogenated vegetable oil layers and absorbed thereon, and an outer coating of an edible shellac.

2. A composition according to claim 1 wherein the crystalline sugar core comprises a sugar particle of a size greater than about 150 mesh.

3. A composition according to claim 1 wherein the crystalline sugar core comprises a sugar particle of a size of about 30–50 mesh.

4. A composition according to claim 1 wherein the sugar is sucrose.

5. A composition according to claim 1 wherein the hydrogenated vegetable oil is in a finely powdered form and has a melting point in the range of about 125° to 140°F.

6. A composition according to claim 5 wherein the melting point is about 135°F.

7. A composition according to claim 1 wherein the liquid flavor oil is lemon oil.

8. A composition according to claim 7 wherein the lemon oil includes at least about 50 percent of non-volatile lemon oil.

9. A composition according to claim 8 wherein the non-volatile lemon oil comprises about 75 percent of the total lemon oil.

10. A composition according to claim 1 which further comproses a layer of gum arabic between the outermost layer of hydrogenated vegetable oil and the outer coating of shellac.

11. A composition according to claim 1 wherein the sugar, hydrogenated vegetable oil and flavor oil are present in a weight ratio of about 5:3:2.

12. A composition according to claim 11 wherein the ratio is 6:3:1.

13. In a tea bag comprising a porous paper bag and an amount of cut tea leaves sufficient to brew a preselected portion of tea, the improvement, wherein the tea bag contains an amount of the composition according to claim 1 sufficient to impart the preselected portion of brewed tea the flavor of said liquid flavor oil.

14. A tea bag as claimed in claim 13 wherein the ratio of the amount of the composition to the amount of the cut tea leaves is about 1:6.

15. A tea bag as claimed in claim 14 wherein said improvement further includes a second composition comprising particles of citric acid encapsulated in said hydrogenated vegetable oil.

16. A tea bag as claimed in claim 15 wherein the ratio of the amount of the second composition to the amount of the cut tea leaves is about 1:4.

17. A method of forming a dry, free-flowing particulate flavoring composition said method comprising
   a. adding to a plurality of sugar particles an amount of liquid sugar sufficient to wet said particles without dissolving same,
   b. coating the wetted sugar particles with a finely powdered hydrogenated vegetable oil,
   c. heating the thusly coated particles sufficiently to drive off any moisture remaining thereon without melting the coating,
   d. absorbing a liquid flavor oil onto the dried coating of hydrogenated vegetable oil in an amount sufficient to moisten the hydrogenated vegetable oil without dissolving same,
   e. coating the absorbed liquid flavor oil with an additional portion of hydrogenated vegetable oil,
   f. alternately repeating steps (d) and (e) to build up successive layers of hydrogenated vegetable oil having liquid flavor oil absorbed thereon until a preselected amount of liquid flavor oil is present on the particles,
   g. adding to the particles an ethanolic solution of a water soluble edible shellac, and
   h. evaporating off the ethanol to form a hard outer coating of said shellac on the particles.

18. A method as claimed in claim 17 which further comprises adding about 2–3 percent by weight of gum arabic to the coated particles before adding the ethanolic solution of shellac.

19. A method as claimed in claim 17 wherein the particles are maintained in a constant state of rotation to enable uniform coating and rapid drying to be effected.

20. A method as claimed in claim 18 wherein the particles are maintained in a constant state of rotation to enable uniform coating and rapid drying to be effected.

21. A method as claimed in claim 17 wherein the sugar particles have a mesh size greater than about 150 mesh.

22. A method as claimed in claim 17 wherein the sugar particles have a mesh size of about 30–50 mesh.

23. A method as claimed in claim 17 wherein the liquid sugar is a supersaturated aqueous sugar solution.

24. A method as claimed in claim 17 wherein the sugar is sucrose.

25. A method as claimed in claim 17 wherein the finely powdered hydrogenated vegetable oil has a melting point of about 125°–140°F.

26. A method as claimed in claim 25 wherein the melting point is about 135°F.

27. A method as claimed in claim 17 wherein heating is effected at a temperature of about 115°F.

28. A method as claimed in claim 17 wherein the liquid flavor oil is lemon oil.

29. A method as claimed in claim 28 wherein the lemon oil includes at least 50 percent of non-volatile lemon oil.

30. A method as claimed in claim 29 wherein the non-volatile lemon oil comprises about 75 percent of the total lemon oil.

31. A method as claimed in claim 17 wherein the preselected amount of liquid flavor oil is about 11 percent of the total weight of the particles.

32. A method as claimed in claim 17 wherein the sugar, hydrogenated vegetable oil and liquid flavor oil are present in a weight ratio of about 5:3:2.

33. A method as claimed in claim 32 wherein the ratio is about 6:3:1.

* * * * *

UNITED STATES PATENT OFFICE
CERTIFICATE OF CORRECTION

Patent No. 3,914,439          Dated October 21, 1975

Inventor(s) Robert E. GRAVES

It is certified that error appears in the above-identified patent and that said Letters Patent are hereby corrected as shown below:

Column 5, line 41: "such as hydrogenated" should read -- such a hydrogenated --.

Column 9, line 26: "1 pound (7/8" should read -- 1 pound (1/3 --.

Column 9, line 41: "percent)" should read -- percent --.

Column 10, line 16: "letters" should read -- Letters --.

Column 10, line 47: "comproses" should read -- comprises --.

Signed and Sealed this twentieth Day of January 1976

[SEAL]

Attest:

RUTH C. MASON
*Attesting Officer*

C. MARSHALL DANN
*Commissioner of Patents and Trademarks*